Feb. 25, 1964 YUSUKE SUMIKI ETAL 3,122,574
VARIOTIN AND ITS PRODUCTION AND STABILIZATION
Filed April 3, 1959
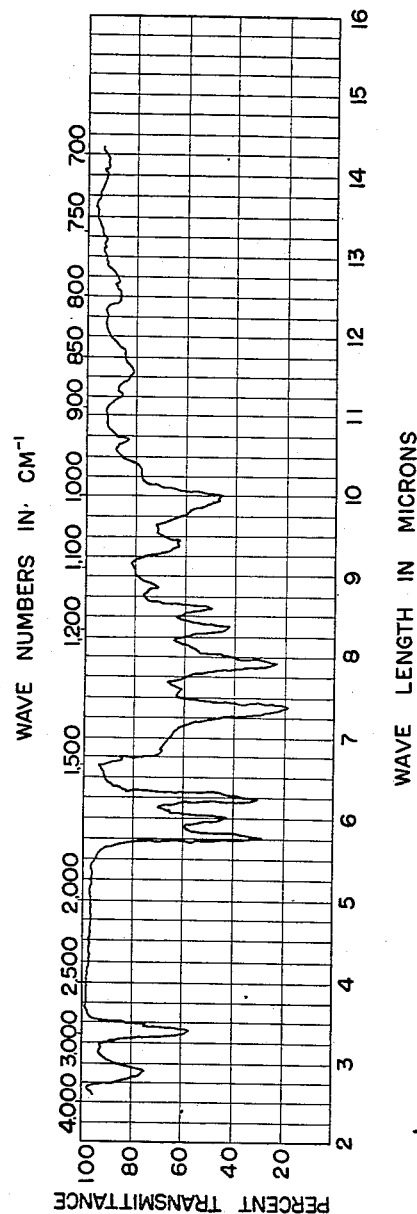
YUSUKE SUMIKI,
HAMAO UMEZAWA,
HIROSHI YONEHARA,
KUNIO YAMANAKA,
TOMOHISA TAKITA,
EIICHIRO AKITO,
KEIHEI UENO
and
KOSAKU TAHARA
INVENTORS,
BY Wenderoth, Lind
and Ponack
ATTORNEYS

3,122,574
VARIOTIN AND ITS PRODUCTION AND STABILIZATION
Yusuke Sumiki, Hamao Umezawa, Hiroshi Yonehara, Kunio Yamanaka, Tomohisa Takita, Eiichiro Akito, Keihei Ueno, and Kosaku Tahara, all of Tokyo, Japan, assignors to Japan Antibiotics Research Association, Tokyo, Japan, an incorporated body of Japan, and Nippon Kayaku Kabushiki Kaisha, Tokyo, Japan, a corporation of Japan
Filed Apr. 3, 1959, Ser. No. 803,954
Claims priority, application Japan Nov. 10, 1958
9 Claims. (Cl. 260—404)

This invention relates to a new and useful antibiotic called variotin. It also relates to the production process of this antibiotic, particularly by fermentation, and its recovery and the stabilization of this antibiotic.

The invention embraces variotin in dilute solutions as stabilized forms and in the purified form.

This new antibiotic is formed during the cultivation under controlled conditions of a novel strain of the known species of microorganism, *Paecilomyces varioti* Bainier. This strain which we have isolated from soil, and which we designate as culture number K–5201, appears to be very similar in cultural characteristics to the description of *Paecilomyces varioti* Bainier described in Thom's Manual of the Penicillia, 1949, p. 691. A culture of the living microorganism has been deposited with and is available from the American Type Culture Collection: it has been designated as ATCC No. 13435.

This new antibiotic is active against a variety of fungi. Several antifungal substances were known to be produced by the cultivation of the microorganisms belonging to the mold. As will be described below, physical, chemical and biological properties of this antibiotic, as well as the characteristics of the strain producing it, differentiate this substance from already known antibiotics.

The new strain No. K–5201 was inoculated as a small spot in the center of Petri-dishes having an internal diameter of 85 mm., and containing Czapek's agar and corn steep agar (Czapek's agar containing 1% of corn steep liquor), respectively.

They were incubated at the temperature of 25° C., 30° C. and 37° C. respectively, and the colonies grown were observed macroscopically and microscopically.

The results obtained were elucidated in the next tables. The descriptive systems herein are those of Shigeo Abe's The Classification of the Genus Penicillium. (See Journal of General and Applied Microbiology, vol. 12, Nos. 1, 2 and 3, 1956.) The colors specified herein are those of Ridgway's Color Standards and Nomenclature.

CHARACTERISTICS OF THE COLONIES OF THE STRAIN NO. K–5201

*Rate of Growth*

[Diameter of the colonies, in mm.]

| Corn steep agar | | | Cultivation temperature, degrees | Czapek's agar | | |
|---|---|---|---|---|---|---|
| 20 days | 10 days | 5 days | | 5 days | 10 days | 20 days |
| -- | 85 | -- | 37 | -- | 85 | -- |
| -- | 85 | -- | 30 | -- | 85 | -- |
| 86 | 85 | 55 | 25 | 55 | 85 | 86 |

| Medium | Czapek's agar | Corn steep agar |
|---|---|---|
| Observation: | | |
| Texture | Funiculose | |
| Depth after 5–6 days cultivation ($\mu$). | 200–600–1,000 | 250–700–1,000. |
| Depth after 10–12 days cultivation ($\mu$). | 300–800–1,200 | 300–900–1,300. |
| Character of surface. | Smooth | |
| Character of margin. | Meanly velutinous | |
| Exudate | None | |
| Color of colony and its change. | Old Gold or Sulphine Yellow→Citrine. | Marginal and Intermediate area: Same as Czapek's agar. Central area: Dark Olive Buff→Buffy Citrine. |
| Reverse of colony. | Marginal Area: Deep Olive Buff. Central Area: Deep Dark Olive→Olivaceous Black. | Same as Czapek's →Chaetura Black. |
| Pigmentation of substrate. | None or Bluish Gray Green. | None. |
| Notice | Slant: Bluish Gray Green. | |

MICROSCOPIC OBSERVATION ON CONIDIAL STAGE OF THE STRAIN NO. K–5201

*Conidia*

| Conidial chain | | | Size | Form | Marking |
|---|---|---|---|---|---|
| Colony, $\mu$ | Slant, $\mu$ | Form | | | |
| 190–340 | 250–390 | Divergent | 3.4–4.5 x 1.7–2.8 5.6–7.6 x 3.1–4.3 (sometimes) | Ellipsoid or Fusiform | Smooth |

*Sterigmata*

| Usual number | Arrangement | Diameter | Length | Form | Marking |
|---|---|---|---|---|---|
| 1–4 | Divergent | 2.8–4.2$\mu$ | 9.3–18.7–21$\mu$ | Paecilomyces | Smooth |

*Metulae*

| Usual number | Arrangement | Apices | Diameter | Length | Marking |
|---|---|---|---|---|---|
| 1–5 | Divergent | 2.8–4.3$\mu$ | 2.8–4.3$\mu$ | 6.2–15.6$\mu$ | Smooth |

*Branches*

| Apices | Diameter | Length | Marking |
|---|---|---|---|
| 3.1–5.0$\mu$ | 2.8–4.9$\mu$ | 6.2–18.7$\mu$ | Smooth |

*Conidiophores*

| Apices | Diameter | Length | Marking |
|---|---|---|---|
| 5.0–7.5$\mu$ | 3.1–5.0$\mu$ | 30–65$\mu$ | Smooth |

Thus, the strain, No. K–5201, shows abundant, widespread growth, the appearance of its colonies being funiculose and not wrinkled and having old gold or sulphine-yellow color which turns into citrine color at a later period of cultivation. Marginal area of the colony represents velvety funiculose texture. With respect to the reverse of the colonies, the marginal area has deep olive buff color and the central area has deep dark olive color, which turn into olivaceous black color after cultivation over 20 days. There is no pigment formation diffusible into culture medium except bluish gray green colored pigment formation in a small extent. In the slant culture a bluish gray green colored pigment formation occasionally observed.

As seen from the microscopic observations, the form of conidia are ellipsoid or fusiform, and the size are 3.4–4.5μ by 1.7–2.8μ and sometimes 5.6–7.5μ by 3.1–4.3μ. Sterigmata are thin and long, their apices being thin and crooked. These are the most characteristics of the genus Paecilomyces. All organs are grown in such manner that they expand diversely. All organs are smooth. The color of the colony together with the pigment formation into culture medium are not same as in the previously known *Paecilomyces varioti* Bainier (see Kenneth B. Raper and Chartes Thom, A Manual of the Penicillia, 1949) but these differences are not so great as to differenciate the strain No. K–5201 as a new species.

Although heretofore there is not any report stating that an antibotic can be obtained by cultivation of a strain of the Paecilomyces, our strain No. K–5201 can produce a new antifungal substance variotin.

Referring to these points mentioned, we have now considered that the strain No. K–5201 is a variant of *Paecilomyces varioti* Bainier, and have designated said strain as *Paecilomyces varioti* Bainier var. *antibioticus*.

It is to be understood that for the production of variotin we do not wish to limit ourselves to the particular isolate here described, as variations may occur in the cultural characteristics of this strain without affecting production of the antibiotic. We especially wish to include in the term "strain *Paecilomyces varioti* Bainier var. *antibioticus*" microorganisms which are mutants obtained by various means which are natural or artificial, such as X-radiation, ultraviolet radiation, nitrogen mustards and so forth.

Variotin is active against a variety of fungi, but not active against bacteria. The potency of variotin may be measured in several ways. The cup-plate method employing a strain of *Penicillium chrysogenum* Q–176 as the test organism is one of the methods. For reference purposes herein, a unit of variotin is the minimum amount of such substance, that will completely inhibit the growth of a standard strain of *Penicillium chrysogenum* Q–176, in one ml. of Czapek's agar.

In accordance with this invention which embraces a process for producing variotin, a variotin-producing strain of the microorganism Paecilomyces is cultivated in a suitable nutrient-containing culture medium under aerobic conditions until substantial anti-microbial activity has been imparted to the medium. Nutrient materials that may be used herein include those which are previously utilized for cultivation of mold. For instance, a carbon source such as sucrose, glucose, fructose, mannose, glycerine, starch, mannan, malt sugar, xylose, lactose, molasses and the like may be used. As nitrogen sources, an inorganic nitrogen source such as sodium nitrate, ammonium nitrate, calcium nitrate, ammonium sulfate and the like and an organic nitrogen source such as soybean meal, peanut meal, cotton seed meal, meat extract, peptone, corn steep liquor, yeast extract and the like may be used. If need, mineral salts like sodium chloride, phosphoric acid salts, heavy metal salts and so forth also may be added to a culture medium.

With respect to a method for the cultivation, solid medium can be used for a significant production of variotin, but for the commercial production liquid medium is preferred and especially submerged culture is successfully employed. Such cultivation may be conducted under aerobic conditions, i.e., aeration of sterilized air, at a cultivation temperature of 20 to 40° C. preferably at about 25° C. until substantial amount of variotin is accumulated in the culture medium. Generally the production of variotin in the highest yield is accomplished by employing shaking culture for a period of 3 to 7 days or tank culture for a period of 2 to 6 days.

In order for the recovery of variotin after completion of cultivation, there are two ways, the one of which comprises at first separating solids from the fermentation broth by filtration and recovering variotin from the solids and the broth filtrates separately, and the other recovering variotin directly from the fermentation broth, as the produced variotin is present in the culture solution and the solids containing mycelium. During the cultivation as well as the extraction, it is preferred to maintain solution at a pH ranging from 4.0 to 7.0, since variotin is stable at a pH of from 4.0 to 7.0, but unstable at a pH exceeding 7.0.

In order for the recovery of variotin from the broth filtrate, from which the solids containing mycelium have been separated, the variotin is extracted with a water immiscible organic solvent such as butanol, amyl alcohol, methyl isobutyl ketone, benzene, chloroform, ethyl acetate, butyl acetate, carbon tetrachloride and so forth, whereby the variotin is extracted into the organic solvent layer in a very good yield. However, the variotin does not so well extracted into ligroin or petroleum ether.

In order for the recovery of variotin from the solids containing wet mycelium, said solids are added with such a water-miscible solvent into which variotin is soluble, for example, acetone, methanol, ethanol or the above mentioned solvents which are used for dissolving out variotin, and after vigorous agitation, insoluble solids are separated by filtration. From the filtrate the solvent is distilled off under a reduced pressure. Then, variotin can be extracted by a water-immiscible organic solvent in the same manner as in the extraction from the broth filtrate.

From the fermentation broth which contains the solids containing mycelium the variotin can be extracted with a water-immiscible solvent with vigorous agitation in such manner as in extraction from the broth filtrate.

When a solution of variotin in an organic solvent, for example, a variotin solution in ethyl acetate, is concentrated under a reduced pressure and dried completely, a red-brownish syrup is obtained. The syrup is dissolved in an organic solvent such as methanol, ether, carbon tetrachloride and so forth, refrigerated and then filtered to remove materials which are insoluble into each of the solvents listed. In a step for purification employing various organic solvents, it is of advantage that a variotin solution in a small amount of an organic solvent such as ether is added with a large volume of petroleum ether or ligroin to precipitate the variotin.

When a variotin solution in the final organic solvent is concentrated under a reduced pressure, the variotin can be obtained as a slightly yellow-colored oily substance having a purity over 140 u./mg.

The variotin which is an oily substance, as prepared just above, is purified by counter-current distribution using water and organic solvents, and the highly active parts of the extract are collected and concentrated under a reduced pressure. Thus, highly purified variotin having the activity over 160 u./mg. is obtained as an oily substance. Physical, chemical and biological properties of variotin prepared by the process above described are as follows: Variotin is a colorless oily substance and has an ester-like fragrant odor. When heated under an ordinary pressure, it is gradually colored at around 150° C. and, at last, turned into dark brownish color to cause decomposition. In this while variotin does not show definite decomposing and boiling points.

Variotin is scarcely soluble in water, petroleum ether and ligroin, but it is soluble in such various organic solvents as methanol, ethanol, butanol, amyl alcohol, ethyl acetate, butyl acetate, acetone, methyl isobutyl ketone, ether, benzene, benzyl ether, chloroform, carbon tetrachloride, carbon disulfide, pyridine, dioxane, cyclohexanol, glycerine, ethylene glycol, acetic acid and so forth. The optical rotation of variotin is $[\alpha]_D^{28} = -5.68°$ (c.=1.0% in methanol). The ultraviolet absorption spectrum of variotin in methanol showed a maximum absorption at 318–324 mμ

$$(E_{1\ cm.}^{1\%} = 1198)$$

Referring to the accompanying FIG. 1 being a curve of the infra-red spectrum of variotin (liquid film), it shows maximum absorption at 3460, 3100, 2950, 2880, 1740, 1670, 1600, 1485, 1465, 1430, 1350, 1310, 1260, 1190, 1160, 1125, 1075, 1065, 1025, 1005, 970, 935, 885, 865, 840, 800, and 715 cm.$^{-1}$.

Elemental analysis of variotin shows values of C, 67.35%; H, 8.58%, N, 4.16% and O, 19.91% (by difference). There are not found sulphur, phosphorus, halogen and ash content.

As will be specified hereinafter, variotin is relatively stable in faintly acidic or neutral reaction, (pH 4.0–7.0) but in alkaline reaction it is very unstable and loses its antibiotic activities rapidly at the room temperature.

Variotin when catalytically reduced in the presence of platinum black is converted into a colorless oily material and loses its antibiotic activity.

Variotin gives positive reactions for diazo, nitroalkyl formation and hydroxamic acid formation reaction, and gives negative reactions for ferric chloride, Millon's, Ehrlich's Sakaguchi's, Molisch, biuret, xantho-protein and ninhydrin reactions.

The antibiotic activities of variotin are determined by dilution methods employing Czapek's medium or Saubraud's medium (glucose-peptone medium), and the results are as follows:

| Organism: | Inhibition dilution (after 7 days incubation at 25° C.) |
|---|---|
| *Penicillium chrysogenum* Q 176 | ×160,000 |
| *Penicillium rubellum* | ×40,000 |
| *Penicillium glaucum* | ×1,000 |
| *Aspergillus clavatus* | ×240,000 |
| *Aspergillus glaucus* | ×50,000 |
| *Aspergillus oryzae* | ×1,000 |
| *Aspergillus niger* | ×1,000 |
| *Aspergillus japonicus* | ×1,000 |
| *Rhizopus javanicus* | ×24,000 |
| *Rhizopus nigricans* | ×1,000 |
| *Rhizopus japonicus* | ×1,000 |
| *Rhizopus delemar* | ×30,000 |
| *Mucor mucedo* | ×1,000 |
| *Monilia formosa* | ×160,000 |
| *Ceratostomella fimbriata* | ×50,000 |
| *Trichophyton interdigitale* | ×160,000 |
| *Trichophyton rubrum* | ×80,000 |
| *Cryptococcus neoformans* | ×320,000 |
| *Microsporum audouini* | ×640,000 |
| *Epidermophyton inguinale* | ×160,000 |
| *Blastomyces dermatitis* | ×1,280,000 |
| *Microsporum japonicum* | ×10,000 |
| *Saccharomyces cerevisiae* | 0 |
| *Zygosaccharomyces salsus* | 0 |
| *Torula utilis* | 0 |
| *Torula rubra* | 0 |
| *Torulaspora delbrückii* | 0 |
| *Hanseniaspora delbrückii* | 0 |
| *Pichia miyaji* | 0 |
| *Willia anomala* | + |
| *Staphylococcus aureus* 209 P | 0 |
| *Escherichia coli* | 0 |
| *Bacillus subtilis* | 0 |
| *Mycobacterium* sp. 607 | 0 |

The activities of variotin against plant-pathogenic microorganisms are determined by agar streak-dilution method and the results are as follows:

| Organism: | Inhibition dilution (after 7 days incubation at 25° C.) |
|---|---|
| *Fusarium bulbigenum* | ×1,000–10,000 |
| *Alternaria bataticola* | ×1,000–10,000 |
| *Colletotrichum lagenarium* | ×100,000–1,000,000 |
| *Phytophthora infestans* | ×1,000–10,000 |
| *Ophiobolus miyabeanus* | ×1,000,000 |
| *Ophiobolus graminis* | ×100,000–1,000,000 |
| *Colletotrichum cingulata* | ×10,000–100,000 |
| *Colletotrichum lindemuthianum* | ×1,000–10,000 |
| *Colletotrichum gossypii* | ×10,000–100,000 |
| *Ceratostomella fimbriata* | ×10,000–100,000 |
| *Endothia parasitica* | ×1,000–10,000 |
| *Rosellinia necatri* | ×1,000–10,000 |
| *Gibberella fujikuroi* | ×10,000–100,000 |

The antifungal activity of variotin adding human serum to the culture medium was examined, using *Tricophyton interdigitale* and *Tricophyton rubrum* as test organisms. Variotin activity was decreased to about a half to a quarter as compared with the case not added human serum.

Variotin was suspended into a sterilized water containing 5% carboxy methyl cellulose and the resulting suspension was intraperitoneally injected to mice in order to test the toxicity of variotin. The administration of variotin at a dosage up to 330 mg./kg. shows no toxic effects. As to a dosage above 330 mg./kg., however, the toxicity of variotin could not be measured, because of the less solubility of variotin in water.

Variotin has a specific antifungal activity shown above table especially to such pathogenic fungi species as *Trichophyton interdigitale, Trichophyton rubrum* and *Cryptococus neoformans* and to such plant pathogenic fungi species as *Colletotrichum lagenarium* and *Gibberella fujikuroi*, and slightly affected its activity by adding human serum to culture medium.

It has been proved that variotin does not irritate the human skin and is only slightly toxic. It is effective in therapy for superficial mycosis especially for dermatomycosis, and from above mentioned facts, we presume it will be effective against systemic mycosis and anthracnose of cucumber and Bakanae-disease of rice plant.

As pointed out hereinbefore, the variotin generally is unstable and, if allowed to remain alone, causes gradual decomposition corresponding to the lapse of time. Degrees of decomposition are set forth in the following table.

| Preservation conditions | Contacted gas | Nitrogen | | Air | |
|---|---|---|---|---|---|
| | Preservation temperature, °C | 5 | 37 | 5 | 37 |
| Decomposition after preservation for 30 days, percent | | 32 | 73 | 51 | 80 |

However, the variotin, when preserved in organic solvent, is relatively stable. That is to say, the variotin which is dissolved in various organic solvents shows a greater stability in these solvents as compared with that of the variotin alone, and the stability of variotin in water or water containing organic solvent is found to depend upon the pH of said variotin solution. We have found that variotin, although it decomposes in an alkaline solution, is stabilized more or less at a pH between 4 and 7 or in a weakly acidic to neutral solution.

As the results of our further studies we have now found that the above said variotin solution, when added with a small amount of antioxidant, chelating agent or both of them, is more fully stabilized whereby the tendency for decomposition of variotin remarkably decreases and thus an exceptionally stable variotin preparation is obtained. In general, the amount of a stabilizing agent which is practically sufficient to stabilization is found to be 0.001 to 0.1% by weight based on the volume of the preparation.

Stabilizing agents which may be adapted to this purpose include antioxidants such as hydroquinone, resorcine, butylhydroxyanisol and butyl hydroxytoluene and chelating agents such as ethylenediamine tetraacetic acid and the salt thereof, 8-hydroxyquinoline and 2,3-dimercapto propanol.

In any preparation forms; for instance ointment, solution, suspension, powder and suppository, variotin preparations containing these stabilizing agents are distinctively more stable than the one not containing them.

The following examples are given as illustrations of the manner in which variotin may be produced, recovered, purified and obtained in a therapeutically useful, stabilized form. The examples given are merely illustrative and are not to be construed as limiting this invention.

EXAMPLE 1

To the basal medium, containing 0.1% of sodium nitrate, 0.2% of potassium biphosphate, 0.05% of magnesium sulfate, 0.05% of potassium chloride and 0.001% of ferrous sulfate and having a pH of 6, 3% of (*a*) sucrose, (*b*) glucose, (*c*) frustose, (*d*) mannose, (*e*) glycerine, (*f*) mannan, (*g*) maltose, (*h*) starch, (*i*) xylose (*j*) lactose and (*k*) galactose were added respectively. A strain No. N-5201 of *Paecilomyces varioti* Bainer var. *antibioticus* was inoculated into each of thus obtained culture media which has been divided into a 500 ml.-volume shaking flask in 100 ml. each and sterilized, and cultivated in the manner of shaking culture at a temperature of 25° C. After cultivation of a period of 3 to 6 days, the maximum production of variotin in the culture solution was obtained. Measurements in accordance with cup assay method showed the respective variotin content expressed in u./ml. of (*a*) 35, (*b*) 17, (*c*) 15, (*d*) 21, (*e*) 13, (*f*) 2, (*g*) 30, (*h*) 22, (*i*) 18, (*j*) 2 and (*k*) 2. Thus variotin was produced by cultivation of a strain No. K-5201 wherein the carbohydrates enumerated above are employed as a carbon source.

EXAMPLE 2

To the basal medium containing 3.0% of sucrose, 0.2% of potassium biphosphate, 0.05% of magnesium sulfate, 0.05% of potassium chloride and 0.001% of ferrous sulfate and having a pH of 6.0, (*a*) 0.3% of sodium nitrate, (*b*) 0.3% of ammonium nitrate, (*c*) 0.5% of ammonium sulfate, (*d*) 0.5% of soybean meal, (*e*) 0.5% of peanut meal, (*f*) 0.5% of cotton seed meal, (*g*) 0.5% of meat extract, (*h*) 0.5% of peptone and (*i*) 1% by weight of corn steep liquor were added respectively. A strain No. K-5201 was inoculated into each of thus prepared media, which have been divided into a 500 ml. volume shaking flask in 100 ml. each and sterilized, and cultivated in the manner of shaking culture at 25° C. After cultivation for 2 to 6 days, the maximum variotin production was accomplished. The bio-assay gave the respective value of the variotin content of (*a*) 35, (*b*) 28, (*c*) 28, (*d*) 12, (*e*) 10, (*f*) 10, (*g*) 12, (*h*) 10 and (*i*) 15, these values being expressed in u./ml. Thus the variotin was produced by cultivation of a strain No. K-5201 wherein the materials enumerated above were employed as a nitrogen source.

EXAMPLE 3

A strain No. K-5201 was inoculated into 10 l. of the culture medium containing 3.0% sucrose, 0.3% sodium nitrate, 0.2% potassium biphosphate, 0.05% magnesium sulfate, 0.05% potassium chloride and 0.001% ferrous sulfate and having a pH of 6. The cultivation was carried out in a small scale aerated tank at a temperature of 25° C. After cultivation for 60 hours, the production of variotin in 30 units was accomplished. At the end of this time, the fermentation broth was separated from the mycelium by filtration and the filtrate was extracted twice with 3 l. of ethyl acetate. The combined extracts were concentrated under a reduced pressure. The concentrate was dissolved into 100 ml. of methanol and after filtering off the insoluble material which formed on refrigeration of the resulting solution, the methanolic solution was concentrated under a reduced pressure. Thus 1.8 gr. of variotin having an activity of 120 u./mg. was obtained.

On the other hand, the mycelium separated by filtration was added with 1 l. of methanol and, after well grinding and stirring, subjected to centrifugal separation. The methanol layer separated was distilled off under a reduced pressure, and then extracted with ethyl acetate. The extract was concentrated under a reduced pressure, and the resulting concentrate was dissolved into about 100 ml. of methanol. After removing insoluble materials which appeared on refrigeration, the methanol solution was concentrated under a reduced pressure whereby 0.8 gr. of variotin having an activity of 90 u./mg. were obtained.

EXAMPLE 4

One hundred liters of the same medium as in Example 3 were charged in a 200 l.-volume fermentation tank. Fifty grams of the steamed rice which has been inoculated with a strain No. K-5201 and fully sporulated after cultivation for a week were seeded to the tank and cultivated with aeration and agitation at a temperature of 26 or 27° C. for 90 hours, said aeration being carried out by sparging of sterilized air at the rate of 90 l. per minute. At the end of the time the fermentation broth showed a variotin content of 16 u./ml. 86 l. of the cultured solution including the mycelium were extracted twice with 30 l. of ethyl acetate, a Sharples centrifugal machine was employed for separation of the solvent. The combined extract was concentrated under a reduced pressure and about 55 gr. of brownish colored syrup was obtained. This syrup was dissolved into 250 ml. of methanol and then refrigerated. Insoluble materials which appeared were removed by filtration. Thus treated methanol solution was concentrated under a reduced pressure and then the resulting syrup was dissolved into ether and insoluble materials were filtered off. The ether solution was concentrated under a reduced pressure to a volume of about 25 ml. and then added with ten times volume of petroleum ether and refrigerated. Oily materials which precipitated were separated from the solvent by decantation and washed with a small volume of petroleum ether. After drying, thus treated oily materials were dissolved into 300 ml. of carbon tetrachloride and then refrigerated. Red-brownish colored oily materials which had formed were removed by decantation and the solution in carbon tetrachloride was concentrated under a reduced pressure, thereby 6.6 gr. of slightly yellow oily substance having an activity of 145 u./mg. was obtained.

One gram of the oily substance obtained just above was subjected to 47 tubes counter-current distribution employing the solvent of 70% methanol and carbon tetrachloride (1:1). The results of bioassay, ultra-violet absorption and measurement of weight showed that the biologically active component was distributed in No. 12 to No. 32 tubes mainly and that No. 21 tube showed the highest concentration of active component. The samples of No. 15 to No. 26 tubes were combined and counter-currently distributed again, 130 tubes being provided. as the result of such counter-current distribution, variotin was distributed into No. 47–No. 73 tubes, in which No. 61 tube showed the highest content of variotin. Each of distribution curves plotted corresponding to bio-assay, ultra-violet absorption and measurement of weight were well agreed with the theoretical curve, and it was proved that variotin is a single substance. The samples of No. 58 to No. 63 tubes were combined and concentrated under a reduced pressure whereby 110 mg. of colorless oily substance having a variotin activity of 166 u./mg. were obtained.

EXAMPLE 5

In preparing 8,000 u./ml. variotin solution, butyl acetate methanol, carbon tetrachloride and 75% aqueous alcohol were employed as a solvent, respectively. Improved stability of variotin in these solvents as compared with the stability of the variotin alone are set forth in the following table.

| Solvent | Butyl acetate | Methanol | Carbon tetrachloride | 75% aqueous alcohol | Control |
|---|---|---|---|---|---|
| Decomposition after preservation for 30 days at 37° C., percent | 9 | 12 | 27 | 29 | 80 |

EXAMPLE 6

To 75% aqueous alcohol 8,000 u./ml. of variotin was dissolved and then 0.1% of hydroquinone was added to this solution. In comparison with the control which was not added with hydroquinone, the above solution was preserved for 30 days at a temperature of 37° C. At the end of this period the solution did not show any decomposition of variotin, but the control showed decomposition of 29% variotin.

EXAMPLE 7

A 8,000 u./ml. variotin solution in butyl acetate was added with 0.05% resorcine and the resulting solution was preserved for 60 days at 37° C. At the end of this period, this solution showed decomposition of only 7% of available variotin while the control which was not added with the resorcine showed decomposition of a half of variotin.

EXAMPLE 8

A 800 u./ml. variotin solution in 75% aqueous alcohol was prepared. As stabilizing agent 0.1% ethylenediamine tetraacetic acid disodium salt was added. The resulting solution was allowed to stand for 60 days at 37° C. At the end of this period, the solution did not show any decomposition while the control which was not added with the ethylene-diamine tetraacetic acid disodium salt showed decomposition of 55% of available variotin.

EXAMPLE 9

A 8,000 u./ml. variotin solution in methanol was added with 0.05% butyl hydroxyanisol and the resulting solution was preserved for 30 days at 37° C. At the end of this period, the present solution did not show any decomposition but the control which was not added with butyl hydroxyanisol showed decomposition of 12% of available variotin.

EXAMPLE 10

A 800 u./ml. variotin solution was prepared employing methanol as solvent. As stabilizing agent 0.01% 8-hydroxyquinoline was added. The resulting solution was allowed to stand for a period of 60 days at a temperature of 37° C. At the end of this period, the present solution showed no decomposition while the control which was not added with 8-hydroxyquinoline showed decomposition of 25% of available variotin.

EXAMPLE 11

A 8,000 u./ml. variotin solution in alcohol was diluted ten times with an ointment base comprising 95% polyethylene glycol and 5% cetanol. As stabilizing agent 0.05% butyl hydroxytoluene was added. The prepared ointment was allowed to stand for 30 days at 37° C. At the end of this period, the present ointment showed no decomposition, while the control which was not added with the butyl hydroxytoluene showed decomposition of 15% of available variotin.

EXAMPLE 12

A 8,000 u./ml. variotin solution in alcohol was diluted ten times with an ointment base containing 95% polyethylene glycol and 5% cetanol. As stabilizing agent 0.1% ethylenediamine tetraacetic acid disodium salt was added. The resulting ointment was allowed to remain for 60 days at 37° C. At the end of this period, the present ointment showed decomposition of only 2% of available variotin while the control which was not added with the ethylenediamine tetraacetic acid disodium salt showed decomposition of 29% of available variotin.

EXAMPLE 13

A 8,000 u./ml. variotin solution in alcohol was diluted ten times with an ointment base consisting of 18% cetanol, 42% Vaseline, 10% propylene glycol, 25% water and 5% polyethylene glycol oleyl alcohol ether. As stabilizing agent, 0.1% 2,3-dimercapto propanol was added. The prepared ointment was allowed to remain for 60 days at 37° C. At the end of this period, the present ointment showed decomposition of only 4% of available variotin, while the control which was not added with the 2,3-dimercapto-propanol showed decomposition of 45% of available variotin.

EXAMPLE 14

A 800 u./ml. variotin solution in 75% alcohol was added with 0.01% ethylenediamine tetraacetic acid disodium salt and 0.01% butylhydroxyanisol as stabilizing agents. The resulting solution was preserved for a period of 100 days at a temperature of 37° C. At the end of this period, the present solution showed no decomposition of available variotin while the control which was not added with the above described stabilizing agents scarcely showed its activity.

Now it will be understood that other procedures may be employed for the production of variotin and for its isolation and purification, for instance in accordance with variations of the sort indicated hereinabove, as well as in other ways consonant with the nature of the substance and its characteristics of solubility and of response to reagents appropriate for use in procedures of this general character. It is therefore to be understood that the invention is not limited to the specific steps and compositions herein described but may be embodied in other ways without departure from the spirit of this invention.

What we claim is:

1. A substance that is called variotin effective in inhibiting the growth of Penicillium, Aspergillus, Rhizopus, Monilia, Trichophyton, Cryptococcus, Microsporum, Epidermophyton and Blastomyces; said substance being a colorless oil having an ester-like fragrant odor and showing no definite decomposition and boiling points; said substance being scarcely soluble in water, petroleum ether and ligroin, and soluble in methanol, ethanol, butanol, amyl alcohol, ethyl acetate, butyl acetate, acetone, methyl isobutyl ketone, ether, benzyl ether, chloroform, carbon tetrachloride, carbon disulfide, pyridine, dioxane, cyclohexanol, glycerine, ethylene glycol and acetic acid; said substance containing the elements carbon, hydrogen, nitrogen and oxygen in the following proportions by weight:

| | |
|---|---|
| Carbon | 67.35 |
| Hydrogen | 8.58 |
| Nitrogen | 4.16 |
| Oxygen (by difference) | 19.91 | said substance being further characterized by the fact that said substance gives positive diazo reaction, Chancel's reaction for tertiary alcohol and Graf's reaction for carbonyl group, and gives negative ferric chloride reaction, Millon's reaction, Ehrlich's reaction, Sakaguchi's reaction, Molish reaction, biuret reaction, xanthoprotein reaction and ninhydrin reaction, and said substance has one peak at between 318 and 324 m$\mu$ in the ultraviolet region of the spectrum and exhibits characteristic absorption in the infrared region at the following wave lengths expressed in reciprocal centimeters; 3460, 3100, 2950, 2880, 1740, 1670, 1600, 1485, 1465, 1430, 1350, 1310, 1260, 1190, 1160, 1125, 1075, 1065, 1025, 1005, 970, 935, 885, 865, 840, 800 and 715.

2. A process for the production of the substance according to claim 1 which comprises cultivating *Paecilomyces varioti* Bainier var. *antibioticus* in a nutrient medium under aerobic conditions until substantial antibiotic activity is imparted to said medium and then recovering the so produced variotin from the fermentation medium.

3. A process for the production of the substance according to claim 1 which comprises cultivating *Paecilomyces varioti* Bainier var. *antibioticus* under agitated submerged aerobic conditions in an aqueous nutrient medium containing a source of carbon selected from the group consisting of sucrose, glucose, fructose, mannose, glycerin, starch, mannan, maltose, xylose, lactose, and molasses; a source of nitrogen selected from the group consisting of sodium nitrate, calcium nitrate, ammonium nitrate, ammonium sulfate, soybean meal, peanut meal, cotton seed meal, meat extract, peptone and corn steep liquor; for a period of from about 2 days to about 6 days and at a temperature of from about 20° C. to about 40° C. and then recovering the so-produced variotin from the fermentation broth by means of organic solvent extraction.

4. A process for the stabilization of the substance according to claim 1 which comprises dissolving said substance in a solvent selected from the group consisting of butyl acetate, methanol, carbon tetrachloride and 75% aqueous alcohol.

5. A process for stabilizing the substance according to claim 1 which comprises adding to said substance at least one member selected from the group consisting of hydroxyquinone, resorcin, butyl hydroxyanisol, butyl hydroxytoluene, 8-hydroxyquinoline, 2,3-dimercaptopropanol, ethylenediamine tetraacetic acid and the corresponding salts.

6. A stable preparation which consists essentially of the substance according to claim 1 and an antioxidant.

7. A stable preparation which consists essentially of the substance according to claim 1 and a chelating agent.

8. A stable preparation which consists essentially of the substance according to claim 1, an antioxidant and a chelating agent.

9. A process for the production of the substance according to claim 1 which comprises cultivating *Paecilomyces varioti* Bainier var. *antibioticus* under agitated submerged aerobic conditions in an aqueous nutrient medium containing a source of carbon and a source of nitrogen.

References Cited in the file of this patent

Florey et al.: "Antibiotics," pp. 237–238, published by Oxford U. Press, N.Y.C., 1949.